United States Patent
Hsieh

(10) Patent No.: US 8,968,596 B2
(45) Date of Patent: Mar. 3, 2015

(54) LIQUID CRYSTAL REACTIVE MONOMER AND LIQUID CRYSTAL PANEL

(75) Inventor: Chung-Ching Hsieh, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 47 days.

(21) Appl. No.: 13/574,524

(22) PCT Filed: Jun. 6, 2012

(86) PCT No.: PCT/CN2012/076496
§ 371 (c)(1),
(2), (4) Date: Jul. 20, 2012

(87) PCT Pub. No.: WO2013/181798
PCT Pub. Date: Dec. 12, 2013

(65) Prior Publication Data
US 2013/0321755 A1    Dec. 5, 2013

(30) Foreign Application Priority Data

Jun. 4, 2012  (CN) .......................... 2012 1 0179675

(51) Int. Cl.
| | |
|---|---|
| *C09K 19/06* | (2006.01) |
| *C09K 19/02* | (2006.01) |
| *G02F 1/1333* | (2006.01) |
| *G02F 1/1337* | (2006.01) |

(52) U.S. Cl.
USPC ........ 252/299.6; 428/1.2; 428/1.26; 349/123; 349/124; 349/183

(58) Field of Classification Search
USPC ........... 428/1.1, 1.2, 1.26; 252/299.01, 299.6; 349/182, 183, 123, 124
See application file for complete search history.

(56) References Cited

U.S. PATENT DOCUMENTS

| | | | |
|---|---|---|---|
| 7,105,209 B2 * | 9/2006 | Heckmeier et al. | ............. 428/1.1 |
| 7,820,070 B2 * | 10/2010 | Hsieh et al. | .............. 252/299.01 |
| 8,501,286 B2 * | 8/2013 | Hsieh et al. | ................... 428/1.2 |

* cited by examiner

*Primary Examiner* — Geraldina Visconti
(74) *Attorney, Agent, or Firm* — Mark M. Friedman

(57) ABSTRACT

The present invention provides a liquid crystal reactive monomer on a polyimide surface of an alignment film and a liquid crystal panel. The liquid crystal reactive monomer has a hard core and is contained in a liquid crystal composition. The liquid crystal reactive monomer is represented by the formula (I) or the formula (II), and the molecular weight thereof is greater than or equal to 300. The solubility of the liquid crystal RMs is significantly improved in a liquid crystal matrix while the returning force of liquid crystal molecules is increased, so as to solve the image sticking issue, increase the polymerization capacity of the liquid crystal molecules, raise the curing speed of the curing reaction between the liquid crystal RMs and the polyimide surface and shorten the curing time, so that the purpose of energy saving and carbon reduction can be achieved.

5 Claims, 1 Drawing Sheet

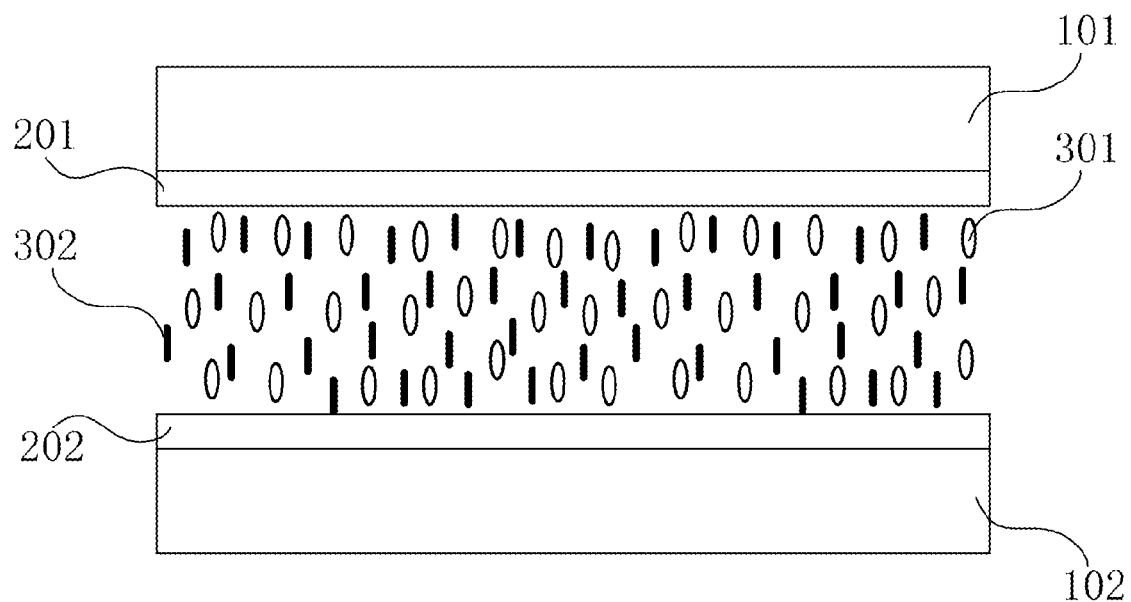

LIQUID CRYSTAL REACTIVE MONOMER AND LIQUID CRYSTAL PANEL

FIELD OF THE INVENTION

The present invention relates to a liquid crystal reactive monomer and a liquid crystal panel, especially relates to liquid crystal reactive monomers on a polyimide surface of an alignment film and a liquid crystal panel having the liquid crystal reactive monomer.

BACKGROUND OF THE INVENTION

In recent years, liquid crystal display (LCD) devices are inseparable with daily life, and the main requirements for LCD devices are wide angle, high contrast, fast screen switching, low power consumption and stable images, wherein one of the problems of the stable images need to be improved is image sticking.

Liquid crystal reactive monomers (RMs) are added to increase the returning force of the liquid crystal molecules so as to improve the image sticking issue, and thus is applied to LCD devices. However, the solubility of the current liquid crystal RMs in liquid crystal matrix is low, and the curing speed thereof is low, so that the improvement of the image sticking is limited.

More specifically, to increase the returning force of the liquid crystal molecules, liquid crystal RMs having hard core and represented by the formula (III) are added into the liquid crystal composition.

(III)

wherein, A is the hard core which contains at least one benzene ring; $R^1$ and $R^2$ are polymer groups, and $R^1$ and $R^2$ are the same or different groups; X is selected from H, F, Cl, $CF_3$ and a straight-chain or branched-chain alkyl group. Referring now to Tab. 1, different performance of different liquid crystal RMs with different volume of hard core is shown in Tab. 1. The experiment shows that the returning force of the liquid crystal molecules relates to the volume of hard core of liquid crystal RMs, that is, the larger volume of the hard core is, the greater returning force of the liquid crystal molecules and the better improvement of the image sticking are. However, the solubility of the liquid crystal RMs in liquid crystal matrix will be reduced if the volume of the hard core is simply increased.

TABLE 1 different performance of different volume of hard core

| liquid crystal RM | benzene ring number of the hard core | curing speed | image sticking phenomenon | the solubility of the liquid crystal RMs in liquid crystal matrix |
|---|---|---|---|---|
| RM1 | 1 | lower | worse | fair |
| RM2 | 2 | fair | fair | fair |
| RM3 | 3 | higher | better | lower |

As a result, it is necessary to provide new liquid crystal RMs to solve the above-mentioned problems existing in the conventional technologies, and to increase the returning force and polymerization capacity of the liquid crystal molecules.

SUMMARY OF THE INVENTION

The first object of the present invention is to provide a liquid crystal RM, which may increase the returning force and polymerization capacity of the liquid crystal molecules so as to solve the image sticking issue and shorten the curing time, and has a high solubility in liquid crystal matrix.

To achieve the above object, the present invention provides a liquid crystal reactive monomer on a polyimide surface of an alignment film, which has a hard core and is contained in a liquid crystal composition, wherein the liquid crystal reactive monomer is represented by the formula (I):

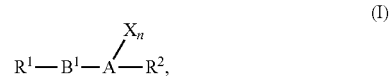

(I)

Wherein,

A is the hard core, which is a group containing two or more benzene rings and preferably containing three benzene rings;

$B^1$ is a linkage group, which has a straight chain of at least one carbon atom;

$R^1$ and $R^2$ are polymer groups, and the $R^1$ and $R^2$ are the same or different groups;

X is selected from one of H, F, Cl, $CF_3$ and a straight-chain or branched-chain alkyl group;

n is the number of X group, $n \geq 1$; and preferably 3; and the molecular weight of the liquid crystal reactive monomer is greater than or equal to 300.

In one embodiment of the present invention, the liquid crystal reactive monomer further has a linkage group $B^2$ between the hard core A and the polymer groups $R^2$ in a straight chain thereof, which is represented by the formula (II):

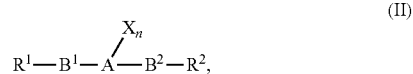

(II)

Wherein, $B^2$ is a linkage group as well as $B^1$, and the $B^2$ has a straight chain of at least one carbon atom; said $B^1$ and $B^2$ are the same or different groups.

In one embodiment of the present invention, the formula of group $B^1$ is $C_jH_{2j}$, and the formula of group $B^2$ is $C_kH_{2k}$, wherein said j or k is selected from 0, 1 or 2, and $j+k \geq 1$.

In one embodiment of the present invention, said polymer groups are selected from acrylate group or methacrylate group.

In one embodiment of the present invention, the liquid crystal composition is a liquid crystal composition of one-drop filling (ODF) technology.

In one embodiment of the present invention, the polyimide surface of the alignment film is formed on a transparent substrate.

In a preferred embodiment of the present invention, the liquid crystal reactive monomer on a polyimide surface of an alignment film is represented by the formula (III), (IV) or (V):

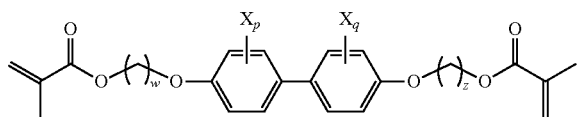

(III)

Wherein,

X is selected from H or F;

p and q are the number of X group, the p and q are independently selected from an integer greater than or equal to 0 (such as 0, 1, 2 . . . ), and p+q≥1;

w and z are independently selected from an integer greater than or equal to 0 (such as 0, 1, 2 . . . ), and w+z≥1.

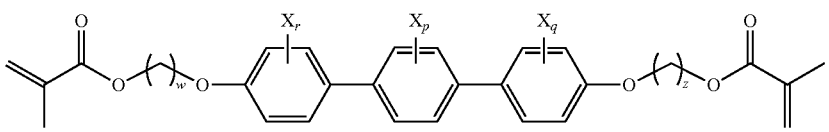

(IV)

Wherein,

X is selected from H or F;

p, q and r are the number of X group, the p, q and r are independently selected from an integer greater than or equal to 0 (such as 0, 1, 2), and r+p+q≥1;

w and z are independently selected from an integer greater than or equal to 0 (such as 0, 1, 2 . . . ), and w+z≥1.

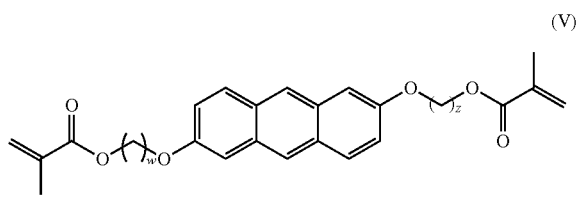

(V)

Wherein, w and z are independently selected from an integer greater than or equal to 0 (such as 0, 1, 2 . . . ), and w+z≥1.

The second object of the present invention is to provide a liquid crystal panel, which comprises:

a first transparent substrate having a first alignment film;

a second transparent substrate having a second alignment film; and a liquid crystal composition filled between the first transparent substrate and the second transparent substrate, wherein the liquid crystal composition is in contact with the first and second alignment film, and the liquid crystal composition contains at least one liquid crystal reactive monomer represented by the formula (I):

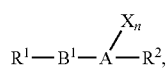

(I)

Wherein,

A is the hard core, which is a group containing two or more benzene rings;

$B^1$ is a linkage group, which has a straight chain of at least one carbon atom;

$R^1$ and $R^2$ are polymer groups, and the $R^1$ and $R^2$ are the same or different groups;

X is selected from one of H, F, Cl, $CF_3$ and a straight-chain or branched-chain alkyl group;

n is the number of X group, n≥1; and the molecular weight of the liquid crystal reactive monomer is greater than or equal to 300.

In one embodiment of the present invention, the liquid crystal reactive monomer further has a linkage group $B^2$ between the hard core A and the polymer groups $R^2$ in a straight chain thereof, which is represented by the formula (II):

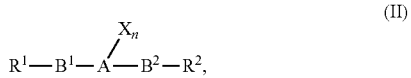

(II)

Wherein $B^2$ is a linkage group as well as $B^1$, and the $B^2$ has a straight chain of at least one carbon atom; said $B^1$ and $B^2$ are the same or different groups.

In one embodiment of the present invention, the formula of group $B^1$ is $C_jH_{2j}$ and the formula of group $B^2$ is $C_kH_{2k}$, wherein said j or k is selected from 0, 1 or 2, and j+k≥1.

In one embodiment of the present invention, said polymer groups are selected from acrylate group or methacrylate group.

In one embodiment of the present invention, the liquid crystal composition is a liquid crystal composition of one-drop filling technology.

In one embodiment of the present invention, the polyimide surface of the alignment film is formed on a transparent substrate.

In one embodiment of the present invention, the transparent substrate is a glass substrate.

In one embodiment of the present invention, the transparent substrate is a flexible polymer substrate or an inflexible polymer substrate.

In a preferred embodiment of the present invention, the present invention provide a liquid crystal panel, which comprises:

a first transparent substrate having a first alignment film;

a second transparent substrate having a second alignment film; and a liquid crystal composition filled between the first transparent substrate and the second transparent substrate, wherein the liquid crystal composition is in contact with the first and second alignment film, and the liquid crystal composition contains at least one liquid crystal reactive monomer represented by the formula (III), (IV), (V):

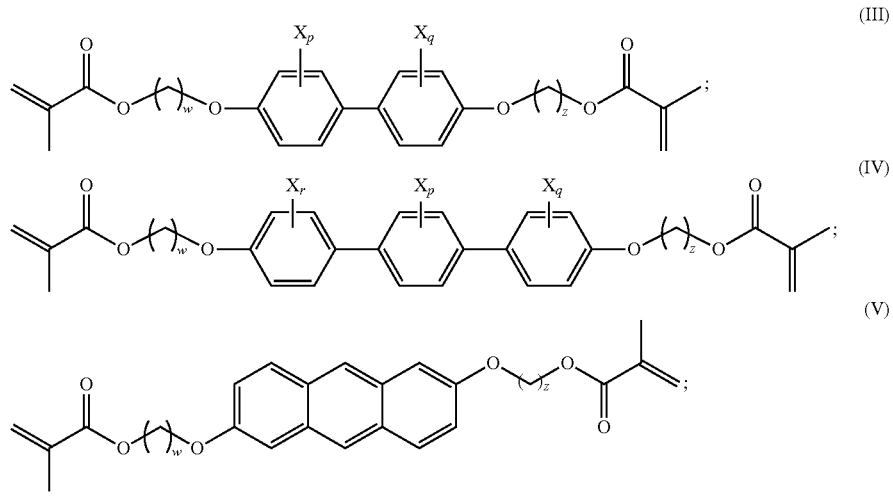

Wherein,

X is selected from H or F;

p, q and r are the number of X group, the p, q and r are independently selected from an integer greater than or equal to 0, and p+q≥1 or r+p+q≥1; and w and z are independently selected from an integer greater than or equal to 0, and w+z≥1.

The positive effect of the present invention is that: the solubility of the liquid crystal RMs in liquid crystal matrix is improved by increasing the length of the main chain of the liquid crystal RMs. Particularly, when the volume of hard core of liquid crystal RMs is excessive, the solubility of the liquid crystal RMs in liquid crystal matrix is obviously improved by increasing the length of the main chain of the liquid crystal RMs, so as to overcome the contradiction between the volume of hard core and the solubility which exist in the conventional technologies. Meanwhile, the liquid crystal RMs of the present invention increase the returning force of the liquid crystal molecules to solve the image sticking issue, increase the polymerization capacity of the liquid crystal molecules, raise the curing speed of the curing reaction between the liquid crystal RMs and the polyimide surface and shorten the curing time, so that the purpose of energy saving and carbon reduction can be achieved.

BRIEF DESCRIPTION OF THE DRAWINGS

FIG. 1 is a liquid crystal panel of the present invention, wherein

| | |
|---|---|
| 101 first transparent substrate; | 102 second transparent substrate; |
| 201 first alignment film; | 202 second alignment film; |
| 301 liquid crystal molecules; | 302 liquid crystal RMs. |

DESCRIPTION OF THE INVENTION

Embodiments, for purposes of explanation, are set forth in order to provide a thorough understanding of the present invention and not to limit the technical solution of the present invention.

EXAMPLE 1

Referring now to FIG. 1, a liquid crystal panel of the present invention is illustrated. The liquid crystal panel comprises:

a first transparent substrate 101 having a first alignment film 201; a second transparent substrate 102 having a second alignment film 202; and a liquid crystal composition filled between the first transparent substrate 101 and the second transparent substrate 102, wherein the liquid crystal composition is in contact with the first and second alignment film, wherein the liquid crystal composition contains liquid crystal molecules 301 and at least one liquid crystal RM 302 represented by the formula (III), (IV) or (V).

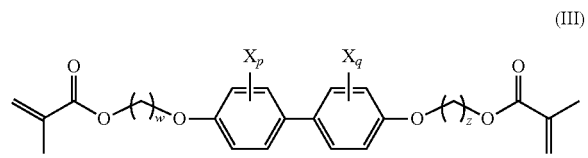

Wherein,

X is selected from H or F;

p and q are the number of X group, the p and q are independently selected from an integer greater than or equal to 0 (such as 0, 1, 2 . . . ), and p+q≥1;

w and z are independently selected from an integer greater than or equal to 0 (such as 0, 1, 2 . . . ), and w+z≥1.

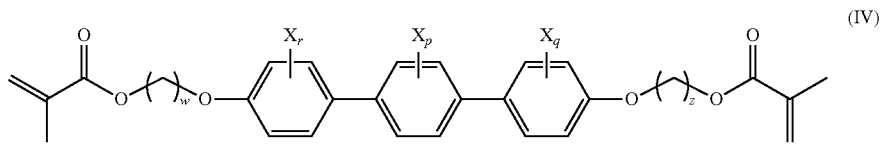

Wherein,

X is selected from H or F;

p, q and r are the number of X group, the p, q and r are independently selected from an integer greater than or equal to 0 (such as 0, 1, 2 . . . ), and r+p+q≥1;

w and z are independently selected from an integer greater than or equal to 0 (such as 0, 1, 2 . . . ), and w+z≥1.

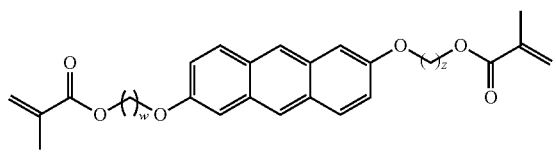

(V)

Wherein, w and z are independently selected from an integer greater than or equal to 0 (such as 0, 1, 2 . . . ), and w+z≥1.

The liquid crystal composition is a liquid crystal composition of one-drop filling technology. The transparent substrate is a glass substrate. The transparent substrate is a flexible polymer substrate or an inflexible polymer substrate.

EXAMPLE 2

A liquid crystal RM is provided in this embodiment, wherein the formula thereof is

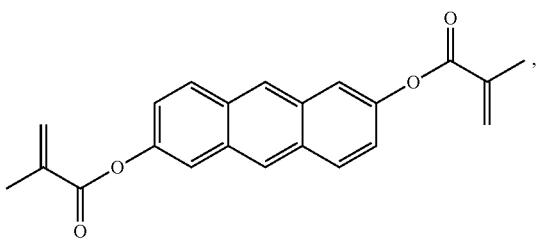 [SMILES: C=C(C)C(=O)Oc1ccc2cc3cc(OC(=O)C(=C)C)ccc3cc2c1]

and the scheme thereof is as follows.

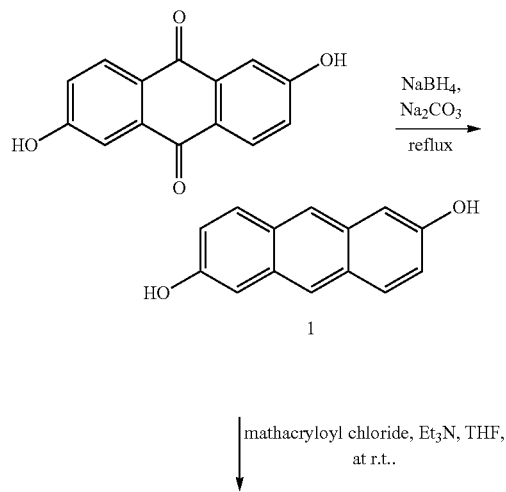

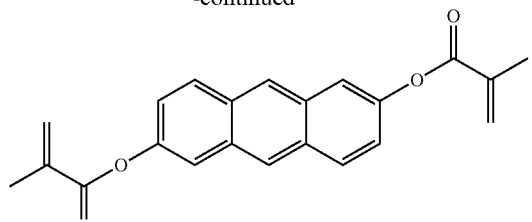

2

The preparation method thereof is as follows:

(A) Preparing the Intermediate (1)

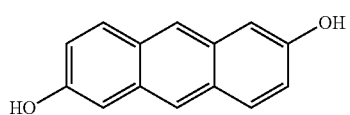

1

Dissolving 10 mmol 2,6-Dihydroxyanthraquinone in 150 ml Na₂CO₃ solution at a concentration of 2N, followed by adding 127 mmol NaBH₄ into the reaction slowly. Stirring and carrying out reaction at room temperature for 3 hours, until no gas is produced. Then, heating and refluxing for 10 minutes. Acidizing the reaction by dripping concentrated HCl slowly into the reaction after cooling. The precipitate is dissolved with acetone after filtered out and collected. The solution is dehydrated with MgSO₄, suction-filtrated, and then concentrated and vacuumed to obtain a red-brown solid. Lastly, the red-brown solid is purified with EA/Hexane=1/1 through silica gel column chromatography and recrystallized with ethanol to gain a light red-brown crystal;

(B) Preparing the Target Product

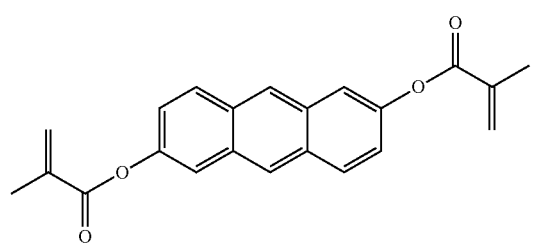

2

4.14 mmol intermediate (1) is loaded into a 250 ml two-neck bottle which is then deaerated by a vacuum dehydrating and deaerating device and filled with nitrogen for three times. The nitrogen is connected to the drip tube for making the reaction system anaerobic and anhydrous. At room temperature, 8.28 mmol triethylamine (Et₃N) and 50 ml dehydrated tetrahydrofuran (THF) are added to the reaction system and are stirred until being dissolved. Finally, under an ice bath, 9.11 mmol methacryloyl chloride is added to react at the room temperature until the next day. The reaction system is suction-filtrated with THF, and the filtrate is collected, decompressed and concentrated, extracted with ethylamine (EA) and water, dehydrated with MgSO₄ and suction-filtrated, and then concentrated and vacuumed to obtain a yellow solid. Lastly, the yellow solid is purified with EA/Hexane=1/6 through silica gel column chromatography to gain a light yellow solid (which may be recrystallized with THF/methanol).

EXAMPLE 3

A liquid crystal RM is provided in this embodiment, wherein the formula thereof is

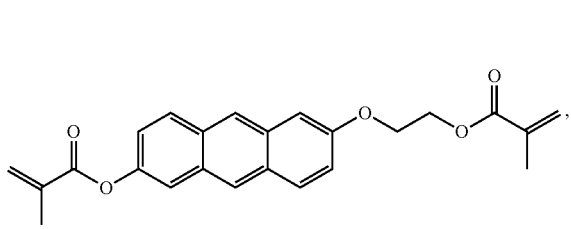 [SMILES: C=C(C)C(=O)OCCOc1ccc2cc3cc(OC(=O)C(=C)C)ccc3cc2c1]

and the scheme thereof is as follows.

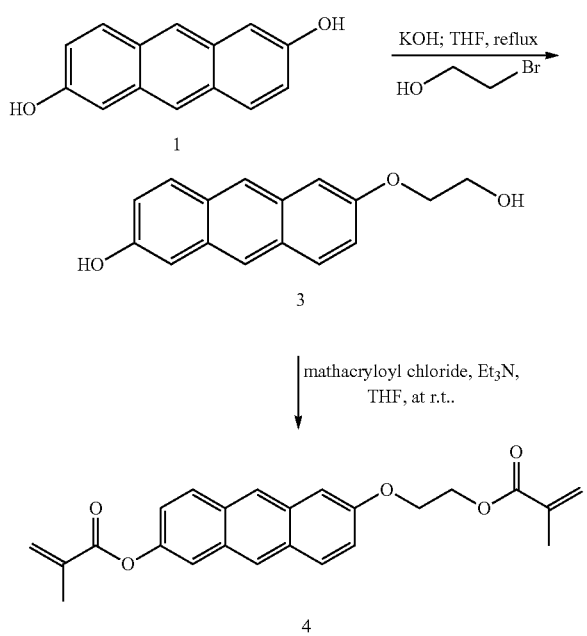

The preparation method thereof is as follows:

(A) Preparing the Intermediate (3)

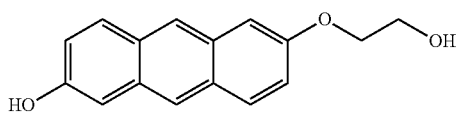

Dissolving 10 mmol intermediate (1) in 150 ml KOH/THF solution at a concentration of 2N followed by adding 5 mmol 2-bromoethanol into the reaction slowly. Then, heating and refluxing for 24 hours. Acidizing the reaction by dripping concentrated HCl slowly into the reaction after cooling. The reaction system is extracted with ethylamine (EA) and water, dehydrated with MgSO₄ and suction-filtrated, and then concentrated and vacuumed to obtain a yellow liquid. Lastly, the yellow liquid is purified with EA/Hexane=¼ through silica gel column chromatography and recrystallized with ethanol to gain a light yellow liquid.

(B) Preparing the Target Product

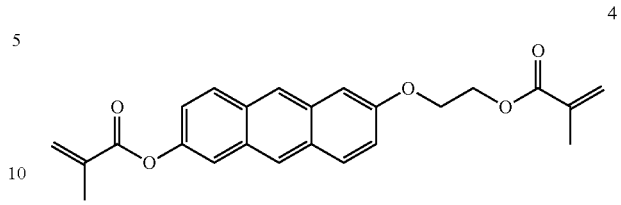

10 mmol intermediate (3) is loaded into a 250 ml two-neck bottle which is then deaerated by a vacuum dehydrating and deaerating device and filled with nitrogen for three times. The nitrogen is connected to the drip tube for making the reaction system anaerobic and anhydrous. At room temperature, 8.28 mmol Et₃N and 50 ml dehydrated THF are added to the reaction system and are stirred until being dissolved. Finally, under an ice bath, 9.11 mmol methacryloyl chloride is added to react at the room temperature until the next day. The reaction system is suction filtrated with THF, and the filtrate is collected, decompressed and concentrated, extracted with ethylamine (EA) and water, dehydrated with MgSO₄ and suction-filtrated, and then concentrated and vacuumed to obtain a yellow solid. Lastly, the yellow solid is purified with EA/Hexane=⅙ through silica gel column chromatography to gain a light yellow solid (which may be recrystallized with THF/methanol).

EXAMPLE 4

The embodiment provides a liquid crystal RM, which has a hard core and is contained in a liquid crystal composition, wherein the liquid crystal reactive monomer is represented by the formula (I):

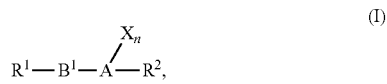

(I)

Wherein,

A is the hard core, which is a group containing two or more benzene rings;

$B^1$ is a linkage group, which has a straight chain of at least one carbon atom;

$R^1$ and $R^2$ are polymer groups, and the $R^1$ and $R^2$ are the same or different groups;

X is selected from one of H, F, Cl, $CF_3$ and a straight-chain or branched-chain alkyl group;

n is the number of X group, and n≥1; and the molecular weight of the liquid crystal reactive monomer is greater than or equal to 300.

Preferably, the liquid crystal RM also contains a linkage group $B^2$ between the hard core A and the polymer groups $R^2$ in a straight chain thereof, which is represented by the formula (II):

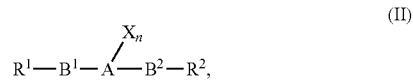

(II)

Wherein $B^2$ is a linkage group as well as $B^1$, and the $B^1$ and $B^2$ each has a straight chain of at least one carbon atom; said $B^1$ and $B^2$ are the same or different groups.

Preferably, the polymer groups are selected from acrylate group or methacrylate group.

In this embodiment, the liquid crystal composition is a liquid crystal composition of one-drop filling (ODF) technology. The polyimide surface of the alignment film is formed on a transparent substrate. The transparent substrate is a glass substrate. The transparent substrate may also be a flexible polymer substrate or an inflexible polymer substrate.

In this embodiment, linkage groups having carbon chains of different lengths are introduced in the hard core containing 1~3 benzene rings to examine the curing speed, the solubility in liquid crystal matrix and image sticking phenomenon of different liquid crystal RMs (RM B-1~3 and RM C-1~3) under the same polyimide surface of the alignment film condition. Specifically, each hard core of RM B-1~3 contains 2 benzene rings and each hard core of RM C-1~3 contains 3 benzene rings.

The liquid crystal RM B-1 matches the formula (I), in which the linkage group $B^1$ is a straight-chain alkyl group containing one carbon atom.

The liquid crystal RM B-2 matches the formula (I), in which the linkage group $B^1$ is a straight-chain alkyl group containing two carbon atoms.

The liquid crystal RM B-3 matches the formula (II), in which the linkage group $B^1$ is a straight-chain alkyl group containing two carbon atoms and the linkage group $B^2$ is a straight-chain alkyl group containing two carbon atoms.

The liquid crystal RM C-1 matches the formula (I), in which the linkage group $B^1$ is a straight-chain alkyl group containing two carbon atoms.

The liquid crystal RM C-2 matches the formula (I), in which the linkage group $B^1$ is a straight-chain alkyl group containing four carbon atoms.

The liquid crystal RM C-3 matches the formula (II), in which the linkage group $B^1$ is a straight-chain alkyl group containing two carbon atoms and the linkage group $B^2$ is a straight-chain alkyl group containing two carbon atoms.

The liquid crystal RM A, RM B and RM C are control groups, all of which contains no linkage group and the hard core independently contains 1~3 benzene rings.

Referring now to Tab.2, the results of the examination of the curing speed, solubility in liquid crystal matrix and image sticking phenomenon of liquid crystal RMs mentioned above under the same polyimide of the alignment film condition.

TABLE 2 different performance of different volume of hard core

| liquid crystal RM | benzene ring number of the hard core | The length of linkage group $B^1$ | $B^2$ | curing speed | The improvement of image sticking phenomenon | the solubility of the liquid crystal RMs in liquid crystal matrix |
|---|---|---|---|---|---|---|
| A | 1 | 0 | 0 | v | v | ii |
| B | 2 | 0 | 0 | ii | ii | ii |
| B-1 | 2 | 1 | 0 | ii | ii | ii |
| B-2 | 2 | 2 | 0 | ii | iii | ii |
| B-3 | 2 | 2 | 2 | ii | iv | i |
| C | 3 | 0 | 0 | i | i | iv |
| C-1 | 3 | 2 | 0 | i | ii | ii |
| C-2 | 3 | 4 | 0 | i | iii | i |
| C-3 | 3 | 2 | 2 | i | iii | i |

Wherein i, ii, iii, iv and v are levels of effect, in which i is the best, while v is the worst.

Clearly, it is come to the following conclusion:

(1) the more benzene rings the hard core contains, the better improvement of image sticking phenomenon is. Comparing to three groups: RM A, RM B and RM C; RM B-2 and RM C-1; and, RM B-3 and RM C-3, the number of the benzene ring contained in hard core is the only variable, it is clear that the more benzene rings the hard core contains, the better the improvement of image sticking phenomenon is and the higher the curing speed is.

(2) the longer the main chain of the liquid crystal RM is, the better the solubility in liquid crystal matrix is.

Comparing RM B and RM B-1~3, RM C and RM C-1~3, it is come to a conclusion that under the same number of the benzene ring contained in the hard core (i.e. the same volume of hard core), a longer main chain of the liquid crystal RM results in a better solubility of the liquid crystal RM in liquid crystal matrix. The improvement is more obvious in particularly excessive volume of hard core.

Therefore, the liquid crystal RMs of the present invention improve the solubility of the liquid crystal RMs in liquid crystal matrix by increasing the linkage groups to increase the length of the main chain of the liquid crystal RMs, so as to overcome the contradiction between the improvement of image sticking phenomenon and the solubility which exist in the conventional technologies.

The liquid crystal RMs of the present invention (liquid crystal RM B-1~3 and liquid crystal RM C-1~3) overcome the problems of the conventional liquid crystal RMs. The liquid crystal RMs of the present invention significantly improve the solubility of the liquid crystal RMs in liquid crystal matrix, and simultaneously solve the image sticking issue, raise the curing speed of the curing reaction between the liquid crystal RMs and the polyimide surface, and shorten the curing time, so as to achieve the purpose of energy saving and carbon reduction.

The present invention has been described with relative embodiments which are examples of the present invention only. It should be noted that the embodiments disclosed are not the limit of the scope of the present invention. Conversely, modifications to the scope and the spirit of the claims, as well as the equal of the claims, are within the scope of the present invention.

What is claimed is:

1. A liquid crystal reactive monomer on a polyimide surface of an alignment film, which has a hard core and contained in a liquid crystal composition, wherein the liquid crystal reactive monomer is represented by the formula (VI):

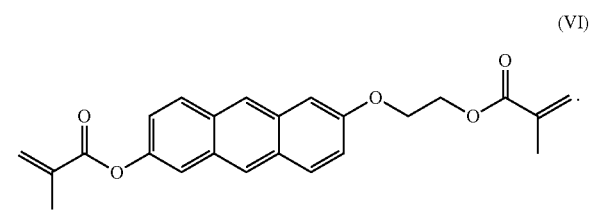 [SMILES: C=C(C)C(=O)OCCOc1ccc2cc3cc(OC(=O)C(=C)C)ccc3cc2c1]

(VI)

2. The liquid crystal reactive monomer according to claim 1, wherein the liquid crystal composition is a liquid crystal composition of one-drop filling technology.

3. The liquid crystal reactive monomer according to claim 1, wherein the polyimide surface of the alignment film is formed on a transparent substrate.

4. A liquid crystal panel, wherein the liquid crystal panel comprises:
   a first transparent substrate having a first alignment film;
   a second transparent substrate having a second alignment film; and
   a liquid crystal composition filled between the first transparent substrate and the second transparent substrate, wherein the liquid crystal composition is in contact with the first and second alignment films, the liquid crystal composition contains at least one liquid crystal reactive monomer represented by the formula (VI):

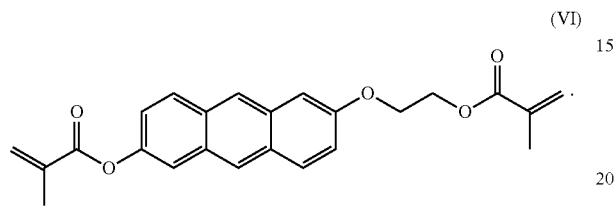

5. The liquid crystal panel according to claim 4, wherein the liquid crystal composition is a liquid crystal composition of one-drop filling technology.

* * * * *